Patented Dec. 10, 1940

2,224,297

UNITED STATES PATENT OFFICE 2,224,297

TREATMENT OF OIL WELLS

Harrison Howard Holmes, Woodbury, N. J., assignor to E. I. du Pont de Nemours & Company, Wilmington, Del., a corporation of Delaware No Drawing. Application April 13, 1939, Serial No. 267,611

6 Claims. (Cl. 166—21)

This invention relates to a method of treating wells for the purpose of increasing the fluid flow therein, and more particularly to the treatment of oil or gas wells in calcareous formations.

It is known that oil wells after a certain period of natural flow frequently decline in output to a point where further operation is unprofitable. In many such cases it has been found possible to increase or restore flow of oil by treatment of the well with an acid solution, this solution being introduced into the well cavity in any desired manner. The most commonly practiced method has comprised the use of hydrochloric acid of a strength between 3 and 25%, and 15% HCl has been considered a suitable concentration. Preferably a corrosion inhibitor is employed with the acid in order to reduce the corrosive effects on the metallic casing and other metal parts. While the methods of the prior art have been effective, they have not been free from objectionable features.

The object of the present invention is a new and improved method of treating wells, whereby increased fluid flow is obtained. A further object is a method for increasing the flow of oil or gas in wells by increasing the porosity of the rock structure of the well walls, without the disadvantages of methods heretofore in use. A still further object is a method for promoting the flow of fluid in wells in calcareous or limestone formations by an improved treatment of said wells with acid solutions. Additional objects will be disclosed as the invention is described more at length hereinafter.

I have found that the foregoing objects are accomplished when I introduce into said well a compound or material which exhibits an acid reaction in aqueous solution but which does not possess the excessive dissolving power of strong mineral acids such as hydrochloric acid. Preferably I attain this objective by the employment of solutions of salts which become acid by hydrolysis and which then are comparable in acidizing efficiency to aqueous solutions of strong acids. I find the ammonium salts of strong acids to be particularly desirable and effective for such use. Ammonium chloride, ammonium nitrate, ammonium sulfate, and ammonium phosphate are examples of salts hydrolyzable in solution to give an acid reaction such as to make these salts effective according to my invention.

Salts giving the desired weakly-acid solutions have a number of advantages over the strong mineral acids for employment in the so-called "acidizing" treatment of oil wells. The object of their use is to increase the permeability of the rock strata to oil. Whereas the strong mineral acids perform the above function, they have at the same time an unnecessarily high and rapid solvent action on the limestone formation. This means a considerable and expensive consumption of strong acid in dissolving the carbonate immediately adjacent to the wall bore, with the result that the solution is prematurely spent and relatively ineffective in opening up the body of limestone at greater distances from the well. Strong acids have the further disadvantage that a considerable volume of carbon dioxide gas is generated, which gas tends to clog the pores of the rock, thereby hindering the penetration of the solution and its subsequent removal. The weakly-acid solutions according to my invention react more slowly with the oil-producing formation, and therefore penetrate further before becoming spent. Such solutions also move more rapidly and at lower pressures because they do not liberate any considerable volumes of gas. In other words, it appears that the acid-reacting solutions of ammonium salts of strong acids tend to dissolve only the calcareous material along the sides of, and within, the rock channels, thereby enlarging them rather than dissolving the entire wall formation. Furthermore, the said ammonium salt solutions, by reason of their milder action, greatly reduce the probability of loosening particles of sand, which may clog the pores of the formation.

The following tabulation illustrates this advantage of solutions of ammonium chloride and ammonium nitrate as examples of my preferred materials, in comparison with hydrochloric and nitric as examples of strong mineral acids. Chemically equivalent amounts of the various agents are used in all cases. It will be apparent from the table that the amount of limestone dissolved is much less in the case of the solutions of ammonium salts, although the percentage increase in permeability is substantially the same in all cases. The cores used were of oil-producing limestone formations, 2.5 cm. in diameter and 1.0 cm. in length.

Table I

| Treating solution | Grams active agent | Time of treatment, minutes | Treating pressure, mm. Hg | Weight loss of core, percent | Permeability, millidarcies | | |
|---|---|---|---|---|---|---|---|
| | | | | | Before (B) | After (A) | Ratio A/B |
| 5% HCl | 1.0 | 30 | 270 | 13.9 | 191 | 318 | 1.67 |
| 6.3% HNO₃ | 1.3 | 308 | 600 | 5.1 | 4.14 | 9.43 | 2.28 |
| 10% NH₄Cl | 2.0 | 74 | 50 | 1.7 | 16.9 | 35.0 | 2.07 |
| 10% NH₄NO₃ | 2.0 | 58 | 40 | 1.5 | 47.3 | 99.6 | 2.10 |

The foregoing tabulation plainly shows the advantage of solutions according to my invention over the strong acids of the prior art in that substantially equivalent increases in permeability are obtained without unduly high dissolving action. The tabulation also shows that the pressures required to drive the solution through the cores in equal time were much lower in the case of ammonium chloride or nitrate than in the case of hydrochloric or nitric acids. Other advantages will be apparent also; for example, reduced corrosion of iron pipes and fittings without the necessity of incorporating a relatively expensive inhibiting agent in the solution, and the greater convenience and reduced cost in supplying the material at the place of use, since the material can be transported in solid form. The substantial absence of gaseous products has already been mentioned, and this will mean greater facility in injecting the material and in the subsequent removal of the spent liquid.

The beneficial results of my invention are believed to result largely from the fact that, instead of gas development, merely a solubilizing action takes place, doubtless with transformation of normal carbonate to bicarbonate, according to the following reaction:

$$Ca^{++} + CO_3^{--} + H^+ \rightarrow Ca^{++} + HCO_3^-$$

While my preferred materials for use are ammonium salts of strong acids, it will be understood that corresponding salts of other weak bases are likewise applicable, for example aniline hydrochloride, triethanolamine hydrochloride, pyridine hydrochloride, and the like. I intend to exclude from my invention, however, the salts of such metallic radicals as are capable of forming metallic hydroxides insoluble in water, since the formation of such hydroxides would interfere with the efficient functioning of my method. As such undesirable materials, I may cite the salts of aluminum and iron.

I may use, however, in place of the salts exhibiting an acid reaction in aqueous solutions, weak acids themselves which have a solubilizing action on mineral carbonates; for example, carbonic acid, boric acid, and the like. In general, the materials adapted for utilization according to my invention have pH values between 3.5 and 7.0, or in other words hydrogen ion concentrations between $10^{-3.5}$ and $10^{-7.0}$ mols per liter, and are incapable of forming water-insoluble hydroxides. It will be understood, therefore, that, wherever the term "weak acids" is employed, I intend to designate acids falling within this range of hydrogen ion concentration. Likewise the term "strong acids" will apply to acids having pH values lower than 3.5.

In carrying out the above method it will be understood that the preferred treating solution is introduced into the well in the customary manner. Suitable pressure is applied, if necessary, to force the solution as far into the formation as desired. After this solution has been in contact with the limestone, dolomite, or other rock formation a sufficient period of time, the spent solution will desirably be removed from the well. It may be advantageous to make a number of treatments and to pump out the spent liquor between treatments. It will be understood also that it is alternative whether the solution of the desired concentration is prepared before introduction into the well, or the solid salt is introduced and solution subsequently effected. The essential feature is that the treatment of the walls of the well be by means of the materials specified.

It will be apparent that many variations may be made in the details of procedure and in amounts and kinds of materials utilized, without departure from the spirit of the invention. I intend to be limited, therefore, only by the following patent claims.

I claim:

1. The method of treating a well and increasing the fluid flow therein, which comprises introducing into said well, in the absence of strong acids, a material possessing a pH value in aqueous solution between 3.5 and 7.0, and incapable of forming a water-insoluble hydroxide.

2. The method of treating a well in acid-soluble formations, which comprises introducing into said well a material taken from the group consisting of acids possessing a pH value in aqueous solution between 3.5 and 7.0 and of ammonium salts with strong acids, in the absence of strong acids themselves.

3. The method of treating a well, which comprises introducing into said well, in the absence of strong acids, an ammonium salt of a strong acid, and maintaining in said well a solution of said salt at a pH value above 3.5.

4. The method of claim 3, in which the salt is ammonium sulfate.

5. The method of claim 3, in which the salt is ammonium chloride.

6. The method of claim 3, in which the salt is ammonium nitrate.

HARRISON HOWARD HOLMES.